(No Model.)
G. MILLIKEN.
DEVICE FOR SUPPLYING SALT TO STOCK.
No. 338,761. Patented Mar. 30, 1886.
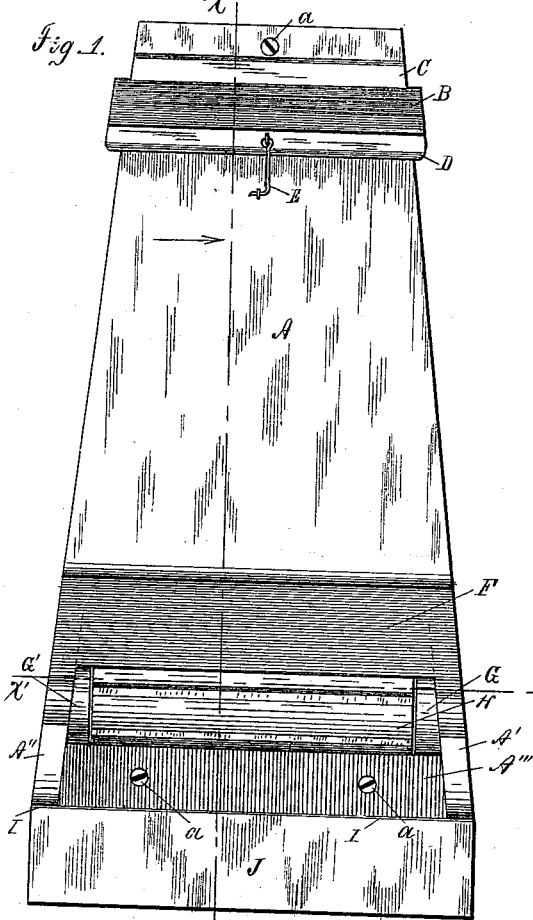
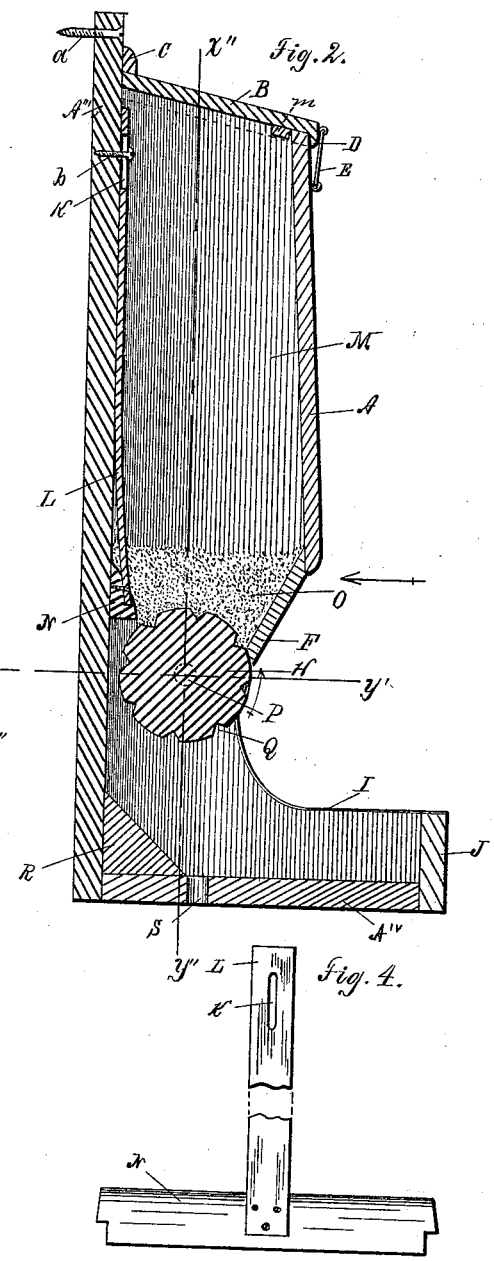
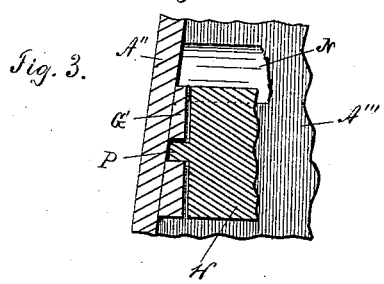
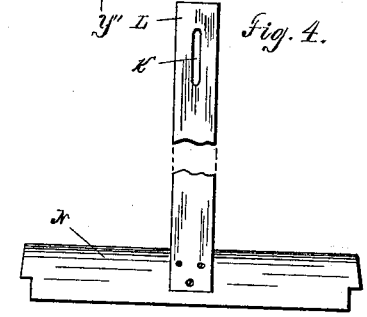
WITNESSES:
H. Poffenberger
J. W. Emmert
INVENTOR
George Milliken
BY Niles & Greene
ATTORNEY
N. PETERS, Photo-Lithographer, Washington, D. C.

UNITED STATES PATENT OFFICE.

GEORGE MILLIKEN, OF ONECO, ILLINOIS, ASSIGNOR OF ONE-HALF TO JAMES C. BIKE, OF SAME PLACE.

DEVICE FOR SUPPLYING SALT TO STOCK.

SPECIFICATION forming part of Letters Patent No. 338,761, dated March 30, 1886.

Application filed October 2, 1885. Serial No. 178,800. (No model.)

*To all whom it may concern:*

Be it known that I, GEORGE MILLIKEN, a resident of Oneco, in the county of Stephenson and State of Illinois, have invented certain new and useful Improvements in Devices for Supplying Salt to Stock; and I do hereby declare the following to be a full, clear, and exact description of the invention, such as will enable others skilled in the art to which it pertains to make and use the same.

My invention relates to improvements in devices for supplying salt to cattle and other stock, and is fully described and claimed in this specification and shown in the accompanying drawings, in which—

Figure 1 is a front elevation of the device. Fig. 2 is a vertical section of the device through the line $x\ y$, Fig. 1. Fig. 3 is a partial vertical section of the device through the line $x''\ y''$, Fig. 2; Fig. 4, a front view of the regulating device shown in Fig. 2.

In these views A is the front, $A'''$ is the back, and $A'\ A''$ are the sides, of a preferably pyramidal salt-receptacle, M, the sides and back being extended below the front and provided with a bottom, $A^{IV}$, and front cleat, J, to form a trough under the salt-receptacle.

The entire device may be fastened in place against the side wall of a barn or other outbuilding by means of screws or nails $a$, passing through the back $A'''$, and the contents of the receptacle are protected by a sloping cover, B, held in place by cleats $C\ m$ on the back and cover, respectively, and by an ordinary hook and staple, E, at the front edge of the cover. The cleat C prevents the admission of moisture at the rear edge of the cover, and the remaining edges are protected by a dependent lip, D, which is outside the walls of the receptacle.

From the lower edge of the front A extends downward and inward a supplemental front piece, F, giving the lower end of the salt-receptacle a hopper form, and below this supplemental front, and between it and the back $A'''$, is a longitudinally-grooved roller, H, formed with gudgeons P, which are journaled in blocks $G\ G'$, attached to the sides $A'\ A''$. The periphery of the roller H is in contact or nearly in contact with the lower edge of the inclined front piece, F, but is separated by a considerable space from the rear wall, $A'''$. Above the roller is a horizontal regulating-block, N, which is fastened to the lower end of a vertical bar, L, attached to the wall $A'''$. The bar is rendered adjustable by a slot, K, and set-screw $b$, and the block N may thus be raised or lowered for the purpose of increasing or decreasing the opening in rear of the roller H, and thus increasing or decreasing the amount of salt which can escape from the receptacle at each rotation of the roller.

In the angle between the back $A'''$ and the bottom $A^{IV}$ of the trough beneath the salt-receptacle is a beveled angle-block, R, adapted to prevent the accumulation of salt in the extreme corner, where it would be inaccessible, and just in front of the angle-block is an opening, S, in the bottom $A^{IV}$. This opening is intended to permit the escape of salt from the trough for the salting of smaller animals than cattle, and may be closed by a suitable stopper when desired.

The operation of the device above described is evident. Salt being placed in the receptacle and the weight of the salt being on the roller H, the rotation of the roller in the direction indicated by the arrow in Fig. 2 carries a portion of the salt downward between the roller and the back $A'''$ and drops it on the angle-block R, and from there to the bottom of the trough. The amount of salt carried downward at each rotation of the roller varies with the position of the block N and the depth of the grooves in the roller. If the grooves be of sufficient depth, the block N may be set in close contact with the periphery of the cylinder, the salt being carried over in the grooves alone; but I prefer to set the block slightly away from the roller, as shown. The salt on the bottom of the trough is readily accessible to stock, and when that is exhausted the licking of the roller rotates it in the direction indicated by the arrow and brings down a new supply. The pyramidal form of the receptacle M above the roller prevents the packing or caking of the salt, which is a material advantage of this shape, and should the salt become solidified the corrugated roller acts as a scraper, and still takes from the mass enough to supply the trough below.

I do not wish to confine myself to the precise form and materials shown and described, since both may be varied within certain limits, while the device remains substantially the same.

I am aware that a stock-salting device has already been patented in which are combined a table, a salt-receptacle above the table, and a vertical cone resting on the table and adapted to distribute salt to various points on the table outside the base of the cone, and also that another patented device consists of a salt-receptacle having a sliding bottom, a trough under the receptacle, and a ball resting on the bottom of the trough, and adapted to crush and distribute salt escaping from the receptacle when the sliding bottom is opened. My device, however, differs widely from either of these, as is evident from the foregoing description and explanation thereof.

What I claim is—

1. In a device for supplying salt to stock, the combination of a salt-receptacle, a trough below said receptacle and rigidly connected therewith, and a roller suspended above said trough and forming the bottom of the salt-receptacle, and adapted, when rotated, to carry downward a portion of the salt therein, said roller and the contents of said trough being readily accessible to stock, substantially as and for the purpose set forth.

2. In a device for supplying salt to stock, the combination of a salt-receptacle, a trough below said receptacle, and a grooved roller supported above said trough by suitable journals and forming the bottom of the salt-receptacle, the rotation of said roller being adapted to carry downward a portion of the salt in the receptacle, and the front of the trough being open, whereby its contents and the roller above it are readily accessible to stock, substantially as and for the purpose set forth.

3. The combined salt-receptacle and trough, consisting of the back $A'''$, the sides $A'\,A''$, the front $A$, and bottom $A^{IV}$, in combination with the journaled roller $H$ above the trough and forming the bottom of the receptacle, the front $A$ of the receptacle being shorter than the back $A'''$, and its lower edge being above the axis of the roller, whereby the roller and the bottom of the trough are readily accessible from the front, substantially as and for the purpose set forth.

4. The combination of the receptacle $M$, the roller $H$ in contact with the front of said receptacle, but separated by a space from the back thereof, and the regulator $L\,N$, attached to the back and adapted to vary the space between the roller and back, substantially as shown and described, and for the purpose set forth.

5. The combination of the receptacle $M$, having the cover $B$, the roller $H$, regulator $L\,N$, and the trough $J$, provided with the aperture $s$, substantially as set forth.

In testimony whereof I have signed this specification in the presence of two subscribing witnesses.

GEORGE MILLIKEN.

Witnesses:
JNO. F. FINK,
J. C. BIKE.